United States Patent
Yu et al.

(10) Patent No.: US 11,125,932 B2
(45) Date of Patent: Sep. 21, 2021

(54) LIGHT GUIDE PLATE AND MANUFACTURING METHOD THEREOF, BACKLIGHT MODULE AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Honghao Yu, Beijing (CN); Hao Zhou, Beijing (CN); Lili Jia, Beijing (CN); Donglei Li, Beijing (CN); Hui Liu, Beijing (CN); Ying Chen, Beijing (CN); Shanshan Liu, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/909,524

(22) Filed: Jun. 23, 2020

(65) Prior Publication Data

US 2021/0018675 A1  Jan. 21, 2021

(30) Foreign Application Priority Data

Jul. 19, 2019 (CN) .......................... 201910653574.1

(51) Int. Cl.
F21V 8/00 (2006.01)
(52) U.S. Cl.
CPC ......... *G02B 6/0061* (2013.01); *G02B 6/0038* (2013.01); *G02B 6/0045* (2013.01); *G02B 6/0055* (2013.01); *G02B 6/0065* (2013.01)
(58) Field of Classification Search
CPC .. G02B 6/0038; G02B 6/0045; G02B 6/0055; G02B 6/0061; G02B 6/0065
See application file for complete search history.

(56) References Cited

U.S. PATENT DOCUMENTS 7,591,580 B2    9/2009  Maeda et al.
8,638,408 B2    1/2014  Wang et al.
(Continued)

FOREIGN PATENT DOCUMENTS

CN    101427070    5/2009
CN    101776246    7/2010
(Continued)

OTHER PUBLICATIONS

Chinese Office Action dated Mar. 27, 2020 corresponding to Chinese Patent Application No. 201910653574.1; 20 pages.

*Primary Examiner* — Thomas M Sember
(74) *Attorney, Agent, or Firm* — Leason Ellis LLP

(57) ABSTRACT

A light guide plate and a manufacturing method thereof, a backlight module, and a display device are provided. The light guide plate includes a light incident surface, a light reflection surface, and a light-emitting surface; the light reflection surface includes a first prism structure array, the first prism structure array includes first prisms arranged in sequence in a first direction, and the first direction is perpendicular to the light incident surface; the first prism structure array is configured to enable light emitted from the light incident surface to be emitted toward the light-emitting surface; and the light-emitting surface includes a second cylindrical structure array, the second cylindrical structure array includes second cylindrical structures arranged side by side in a second direction, the second direction is perpendicular to the first direction, and a first plane including the first direction and the second direction is perpendicular to the light incident surface.

20 Claims, 7 Drawing Sheets

(56) References Cited

U.S. PATENT DOCUMENTS

| | | | |
|---|---|---|---|
| 9,261,640 B2 | 2/2016 | Koike et al. | |
| 2004/0264911 A1 | 12/2004 | Toeda et al. | |
| 2009/0122229 A1* | 5/2009 | Kim | G02B 6/0038 349/65 |

FOREIGN PATENT DOCUMENTS

| | | |
|---|---|---|
| CN | 102537762 | 7/2012 |
| CN | 203365718 | 12/2013 |
| CN | 104181633 | 12/2014 |
| CN | 104246590 | 12/2014 |
| CN | 104880761 | 9/2015 |
| KR | 20080046312 | 5/2008 |
| WO | 2016017492 | 2/2016 |

* cited by examiner

LIGHT GUIDE PLATE AND MANUFACTURING METHOD THEREOF, BACKLIGHT MODULE AND DISPLAY DEVICE

This application claims priority of the Chinese Patent Application No. 201910653574.1, filed on Jul. 19, 2019. For all purposes under the U.S. law, the entire disclosure of the aforementioned application is incorporated by reference as part of the disclosure of this application.

TECHNICAL FIELD

Embodiments of the present disclosure relate to a light guide plate and a manufacturing method thereof, a backlight module, and a display device.

BACKGROUND

With continuous development of display technology, ultra-thin display devices have been more and more widely applied to various fields such as education, medical treatment, entertainment, etc. Currently, as the display device rapidly develops toward a trend of ultra-thinness, an extremely simplified backlight module integrating a plurality of optical functions or having new functions becomes one of main research directions.

SUMMARY

At least an embodiment of the present disclosure provides a light guide plate, and the light guide plate includes a light incident surface, a light reflection surface, and a light-emitting surface; the light reflection surface is opposite to the light-emitting surface, and the light incident surface is connected to the light reflection surface and the light-emitting surface, respectively; the light reflection surface includes a first prism structure array, the first prism structure array includes a plurality of first prisms arranged in sequence in a first direction, and the first direction is perpendicular to the light incident surface; the first prism structure array is configured to enable light emitted from the light incident surface to be emitted toward the light-emitting surface; and the light-emitting surface includes a second cylindrical structure array, the second cylindrical structure array includes a plurality of second cylindrical structures arranged side by side in a second direction, the second direction is perpendicular to the first direction, and a first plane including the first direction and the second direction is perpendicular to the light incident surface.

For example, in the light guide plate provided by at least an embodiment of the present disclosure, the second cylindrical structure is configured to enable light emitted toward the light-emitting surface to be uniformly emitted from the light-emitting surface, and is configured to enable a direction of light emitted from the light-emitting surface to approach a third direction in a second plane perpendicular to the first direction, the third direction being perpendicular to the first plane.

For example, in the light guide plate provided by at least an embodiment of the present disclosure, an outline shape of a cross section of the second cylindrical structure perpendicular to the first direction is a free curve which curves outwards, and a convex direction of the free curve is a direction away from the light reflection surface.

For example, in the light guide plate provided by at least an embodiment of the present disclosure, the free curve includes a first curve portion and a plurality of second curve portions; the first curve portion is at a middle position of the free curve, and the plurality of second curve portions are on both sides of the first curve portion, respectively; and the first curve portion is a convex curve portion, a convex direction of the first curve portion is the direction away from the light reflection surface, and the second curve portions are concave curve portions.

For example, in the light guide plate provided by at least an embodiment of the present disclosure, the plurality of second cylindrical structures are continuously arranged in the second direction, and second curve portions of adjacent second cylindrical structures are directly connected with each other.

For example, in the light guide plate provided by at least an embodiment of the present disclosure, a function expression of the free curve is:

$$y(x) = \frac{cx^2}{1 + \sqrt{1 - (1+k)c^2 x^2}} + \alpha_1 x + \alpha_2 x^2,$$

c is a curvature, k is a conic coefficient, $\alpha_1$ is a primary term coefficient, and $\alpha_2$ is a quadratic term coefficient.

For example, in the light guide plate provided by at least an embodiment of the present disclosure, the first prism structure array is configured to enable the light emitted from the light incident surface to be emitted toward the light-emitting surface in a direction approaching a third direction in a third plane, the third direction is perpendicular to the first plane, and the third plane is perpendicular to the second direction.

For example, in the light guide plate provided by at least an embodiment of the present disclosure, each of the first prisms is in a prism shape and includes an inclined surface enable to be irradiated by the light emitted from the light incident surface, and the inclined surface faces the light incident surface.

For example, in the light guide plate provided by at least an embodiment of the present disclosure, each of the first prisms is in a triangular prism shape and includes a first prism surface and a second prism surface, the first prism surface intersects with the second prism surface, a first angle between the first prism surface and the first plane is from 80° to 90°, a second angle between the second prism surface and the first plane is from 35° to 40°, the second prism surface is the inclined surface facing the light incident surface, and a distance between the light incident surface and an intersection line of the first prism surface and the first plane is less than a distance between the light incident surface and an intersection line of the second prism surface and the first plane.

For example, in the light guide plate provided by at least an embodiment of the present disclosure, the plurality of first prisms are arranged at intervals from the light incident surface in the first direction, and values of the intervals between adjacent first prisms gradually reduce as distances of the intervals away from the light incident surface increase.

For example, in the light guide plate provided by at least an embodiment of the present disclosure, the values of the intervals between the adjacent first prisms are set based on a Bessel function.

For example, in the light guide plate provided by at least an embodiment of the present disclosure, the light guide plate is formed in an integrated structure.

For example, the light guide plate provided by at least an embodiment of the present disclosure further includes a reflective layer, and the reflective layer is on a side of the light reflection surface away from the light-emitting surface.

At least an embodiment of the present disclosure further provides a backlight module, and the backlight module includes a light guide plate, and a light source on a side of the light incident surface of the light guide plate; the light guide plate includes: a light incident surface, a light reflection surface, and a light-emitting surface, the light reflection surface is opposite to the light-emitting surface, and the light incident surface is connected to the light reflection surface and the light-emitting surface, respectively; the light reflection surface includes a first prism structure array, the first prism structure array includes a plurality of first prisms arranged in sequence in a first direction, and the first direction is perpendicular to the light incident surface; the first prism structure array is configured to enable light emitted from the light incident surface to be emitted toward the light-emitting surface; and the light-emitting surface includes a second cylindrical structure array, the second cylindrical structure array includes a plurality of second cylindrical structures arranged side by side in a second direction, the second direction is perpendicular to the first direction, and a first plane including the first direction and the second direction is perpendicular to the light incident surface.

At least an embodiment of the present disclosure further provides a display device, including a display panel and the backlight module according to any one of the embodiments of the present disclosure on a light incident side of the display panel.

At least an embodiment of the present disclosure further provides a manufacturing method of the light guide plate according to any one of the embodiments of the present disclosure, and the manufacturing method includes: forming the first prism structure array on the light reflection surface of the light guide plate, and forming the second cylindrical structure array on the light-emitting surface of the light guide plate.

BRIEF DESCRIPTION OF THE DRAWINGS

In order to clearly illustrate the technical solutions of the embodiments of the present disclosure, the drawings of the embodiments will be briefly described in the following. It is obvious that the described drawings in the following are only related to some embodiments of the present disclosure and thus are not limitative of the present disclosure.

DETAILED DESCRIPTION

Figure 1:
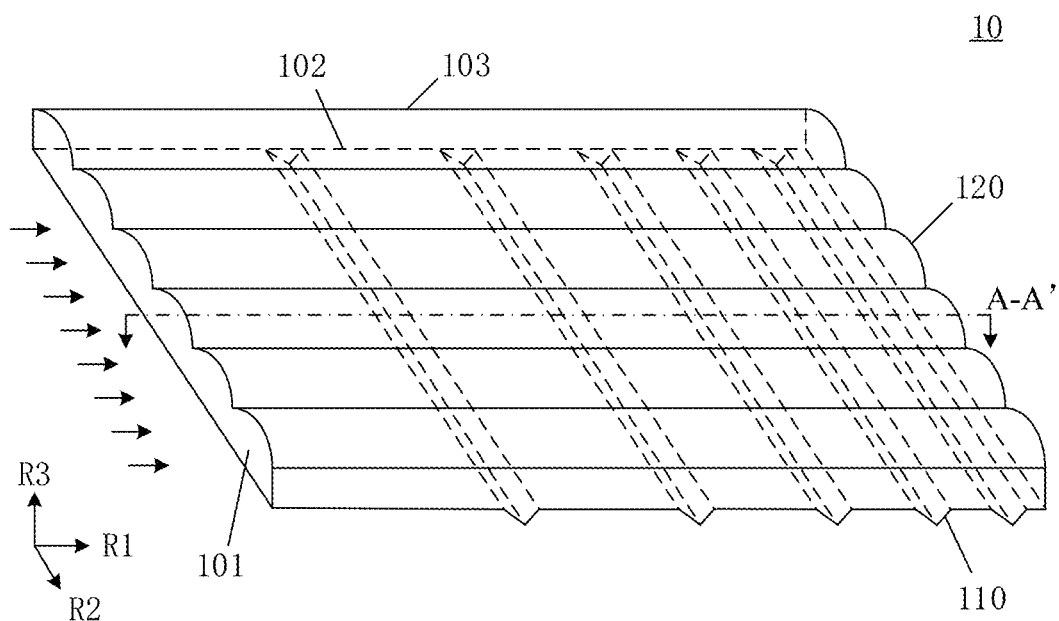
FIG. 1 is a schematic diagram of a stereoscopic structure of a light guide plate provided by some embodiments of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

In the process of designing a backlight module integrating a plurality of optical functions or having new functions, a light guide plate in the backlight module needs to integrate a plurality of functions such as light guide, light homogenization, brightness enhancement, etc. Currently, when preparing the light guide plate integrating the plurality of functions, a variety of functional optical layers including different film materials are usually glued together to form a composite film structure, but the composite film structure may usually increase difficulty in designing and processing the light guide plate, so that the preparation process of the light guide plate needs to satisfy the higher processing accuracy requirements. Therefore, the preparation cost of the light guide plate is greatly increased, and large-scale mass production is difficult to achieve. In addition, because of limitations of materials and processes, the structure and function of the composite film light guide plate formed by the variety of film materials are usually relatively simple, and it is difficult to achieve different technical effects actually required or satisfy different practical application requirements.

At least an embodiment of the present disclosure provides a light guide plate, the light guide plate may guide light emitted into the light guide plate from a light incident surface through the cooperative design of a light reflection surface and a light-emitting surface, and the light guide plate may also shrink a light-emitting angle of light emitted by the light guide plate in different directions, thereby improving the central brightness of the light emitted by the light guide plate to enable the light guide plate to achieve a brightness enhancement function, and improving the brightness and uniformity of light provided by the backlight module including the light guide plate, so that the contrast of the display image of the display device including the light guide plate is improved, and a higher-quality image display effect can be provided for the user.

Hereinafter, some embodiments of the present disclosure are described in detail with reference to the accompanying drawings. It should be noted that the same reference numerals used in different drawings refer to the same described components.

At least an embodiment of the present disclosure provides a light guide plate, and the light guide plate includes: a light incident surface, a light reflection surface, and a light-emitting surface. The light reflection surface is arranged opposite to the light-emitting surface, and the light incident surface is connected to the light reflection surface and the light-emitting surface, respectively. The light reflection surface includes a first prism structure array, the first prism structure array includes a plurality of first prisms arranged in sequence in a first direction, and the first direction is perpendicular to the light incident surface. The first prism structure array is configured to enable light emitted from the light incident surface to be emitted toward the light-emitting surface. The light-emitting surface includes a second cylindrical structure array, the second cylindrical structure array includes a plurality of second cylindrical structures arranged side by side in a second direction, the second direction is perpendicular to the first direction, and a first plane including the first direction and the second direction is perpendicular to the light incident surface.

FIG. 1 is a schematic diagram of a stereoscopic structure of a light guide plate provided by some embodiments of the present disclosure. For example, as illustrated in FIG. 1, a light guide plate 10 includes a light incident surface 101, a light reflection surface 102, and a light-emitting surface 103. The light reflection surface 102 is arranged opposite to the light-emitting surface 103, and the light incident surface 101 is connected with the light reflection surface 102 and the light-emitting surface 103, respectively. The light incident surface 101 allows light from a light source to enter the light guide plate 10, the light reflection surface 102 reflects the light irradiated to the light reflection surface 102, and the light-emitting surface 103 allows the light emitted into the light guide plate 10 to exit. The light reflection surface 102 includes a first prism structure array, the first prism structure array includes a plurality of first prisms 110 arranged in sequence in a first direction R1, the first direction R1 being perpendicular to the light incident surface 101, and the first prism structure array is configured to enable light emitted from the light incident surface 101 to be emitted toward the light-emitting surface 103. The light-emitting surface 103 includes a second cylindrical structure array, the second cylindrical structure array includes a plurality of second cylindrical structures 120 arranged side by side in a second direction R2, the second direction R2 is perpendicular to the first direction R1, and a first plane including the first direction R1 and the second direction R2 is perpendicular to the light incident surface 101.

The light guide plate 10 may guide the light emitted from the light incident surface 101 through the first prism structure array on the light reflection surface 102, so as to allow the light to be emitted toward the light-emitting surface 103, thereby allowing the light-emitting angle of the light emitted into the light guide plate 10 to be reduced. Furthermore, the light guide plate 10 may reduce the light-emitting angle of the light emitted toward the light-emitting surface 103 through the curved surface design of the second cylindrical structure array on the light-emitting surface 103, which may decrease the light-emitting angle of the light emitted from the light-emitting surface 103, so that the light-emitting angle of the light emitted by the light guide plate 10 is reduced, thereby improving the central brightness of the light emitted by the light guide plate 10. Meanwhile, the arrangement direction (i.e., the first direction R1) of the plurality of first prisms 110 is perpendicular to the arrangement direction (i.e., the second direction R2) of the plurality of second cylindrical structures 120, and therefore, the first prism structure array and the second cylindrical structure array may shrink the light-emitting angle of the light emitted by the light guide plate 10 from different directions, respectively, thereby further improving the central brightness of the light emitted by the light guide plate 10 to enable the light guide plate 10 to achieve the brightness enhancement function, and improving the contrast of the display image of the display device including the light guide plate 10, so that a higher-quality image display effect can be provided for the user.

It should be noted that in the present embodiments as illustrated in FIG. 1, the first prism 110 is in a triangular prism shape, and in some other embodiments of the present disclosure, the first prism may also be in a quadrangular prism shape, a pentagonal prism shape, or other prism shapes. The embodiments of the present disclosure are not limited in this aspect.

It should be noted that in the present embodiments as illustrated in FIG. 1, the number of the first prisms 110 included in the first prism structure array and the number of the second cylindrical structures 120 included in the second cylindrical structure array are only illustrative descriptions. According to different actual needs, the first prism structure array may also include only one first prism 110 or include two, three, four, six, or more first prisms 110 arranged in sequence, and the second cylindrical structure array may also include only one second cylindrical structure 120 or include two, three, four, five, seven, or more second cylindrical structures 120 arranged side by side. The number of the first prism 110 and the number of the second cylindrical structure 120 are not limited by the embodiments of the present disclosure.

By taking the light guide plate 10 illustrated in FIG. 1 as an example, the structures and functions of the first prism structure array and the second cylindrical structure array are specifically described below in connection with cross sections of the light guide plate 10 perpendicular to different directions.

For example, in the present embodiments as illustrated in FIG. 1, the plane including the first direction R1 and the second direction R2 is the first plane, and a third direction R3 is perpendicular to the first plane, that is, the first direction R1, the second direction R2, and the third direction R3 are perpendicular to each other. Hereinafter, a plane including the second direction R2 and the third direction R3 being a second plane (that is, a plane perpendicular to the first direction R1), and a plane including the first direction R1 and the third direction R3 being a third plane (that is, a plane perpendicular to the second direction R2) are described as an example.

Figure 2:
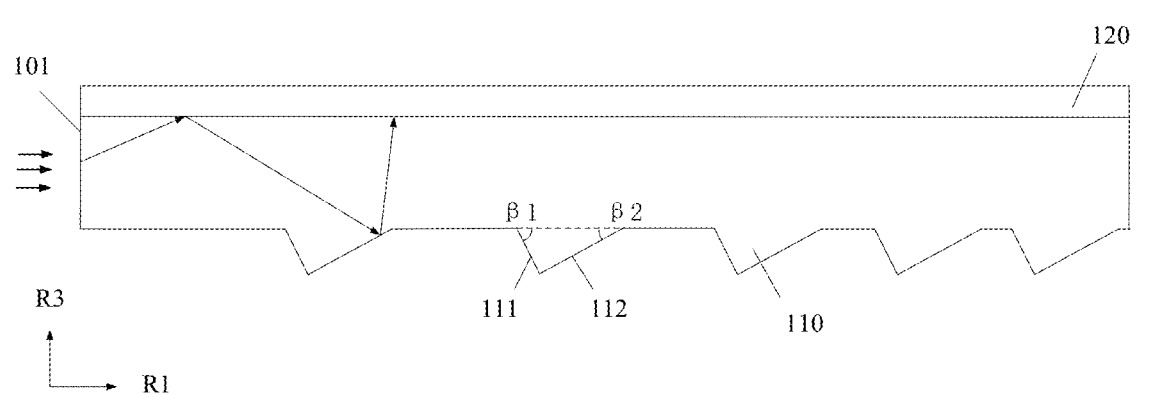
FIG. 2 is a schematic diagram of a cross section of the light guide plate illustrated in FIG. 1 perpendicular to a second direction R2.

FIG. 2 is a schematic diagram of a cross section of the light guide plate illustrated in FIG. 1 perpendicular to the second direction R2, that is, a schematic diagram of a section of the light guide plate 10 parallel to the third plane along a line A-A' illustrated in FIG. 1.

For example, as illustrated in FIG. 1 and FIG. 2, the first prism 110 is in a triangular prism shape and includes a first prism surface 111 and a second prism surface 112, and the first prism surface 111 intersects with the second prism surface 112. The first prism surface 111 is an inclined surface facing away from the light incident surface 101, and a first angle 131 between the first prism surface 111 and the first plane is from 80° to 90°. The second prism surface 112 is an inclined surface facing the light incident surface 101, and a second angle 132 between the second prism surface 112 and the first plane is from 35° to 40°. A distance between the light incident surface 101 and an intersection line of the first prism surface 111 and the first plane is less than a distance between the light incident surface 101 and an intersection line of the second prism surface 112 and the first plane, that is, the intersection line of the second prism surface 112 and the first plane is located on a side, away from the light incident surface 101, of the intersection line of the first prism surface 111 and the first plane.

For example, when light from a light source and within a certain angle range is emitted into the light guide plate 10 from the light incident surface 101, the light is totally reflected and transmitted in the light guide plate 10 to be transmitted to different positions in the light guide plate 10. When the light is irradiated onto the second prism surface 112 of the first prism 110, because the second prism surface 112 is inclined toward the light incident surface 101, the light reflected by the second prism surface 112 is emitted toward the light-emitting surface 103, so that the total reflection path of the light in the light guide plate 10 is changed.

For example, in some embodiments of the present disclosure, by adjusting the second angle 132 between the second prism surface 112 and the first plane, the light reflected by the second prism surface 112 may be emitted toward the light-emitting surface 103 in a direction approaching the third direction R3, that is, emitted toward the light-emitting surface 103 in an approximately collimated manner. Therefore, the light emitted toward the light-emitting surface 103 may be emitted from the light-emitting surface 103 in an approximately collimated direction, so that the light-emitting angle of the light emitted by the light guide plate 10 in the third plane including the first direction R1 and the third direction R3 may be reduced, thereby improving the central brightness of the light emitted by the light guide plate 10.

For example, in the present embodiments, the second angle β2 between the second prism surface 112 and the first plane may be set between 35° and 40°, so that the light reflected by the second prism surface 112 may be emitted toward the light-emitting surface 103 in the direction approaching the third direction R3. Correspondingly, the first angle β1 between the first prism surface 111 and the first plane may be set between 80° and 90°, so that the light emitted from the light incident surface 101 may be irradiated to the second prism surface 112, thereby guiding the light in the light guide plate 10.

For example, a width of the first prism 110 may be 0.2 mm, that is, for each first prism 110, a distance between the intersection line of the first prism surface 111 and the first plane, and the intersection line of the second prism surface 112 and the first plane may be 0.2 mm.

Figure 3:
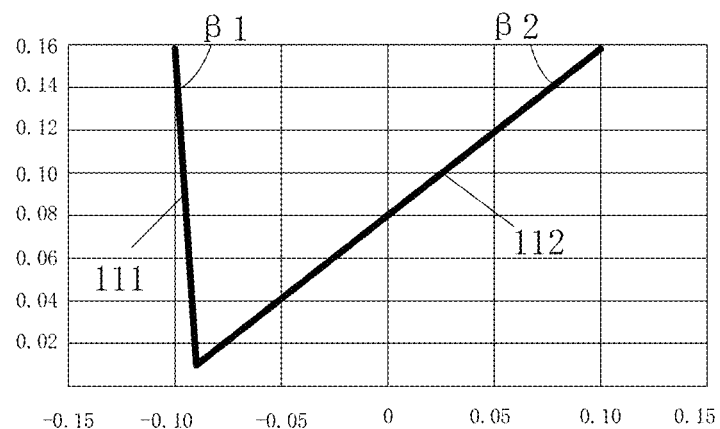
FIG. 3 is a schematic diagram of a cross-sectional structure of one specific example of a first prism illustrated in FIG. 2.

For example, in the case where the width of the first prism 110 is 0.2 mm, the cross-sectional structure of the first prism 110 perpendicular to the second direction R2 may be as illustrated in FIG. 3. For example, as illustrated in FIG. 3, in combination with the value range of the first angle β1 and the value range of the second angle β2, a length of an orthographic projection of the first prism surface 111 in the third plane may be less than 0.2 mm, that is, less than the width of the first prism 110; and a length of an orthographic projection of the second prism surface 112 in the third plane may be greater than 0.2 mm, that is, greater than the width of the first prism 110.

It should be noted that FIG. 3 is only an example of a cross-sectional structure of the first prism 110 perpendicular to the second direction R2 provided by the present embodiments, and the embodiments of the present disclosure are not limited in this aspect. For example, the width of the first prism 110 may be set according to different practical application scenarios, and specific values of the first angle β1 and the second angle β2 may also be adjusted accordingly within the above ranges according to different practical requirements, thereby determining the specific structure of the first prism 110. Furthermore, the widths of the first prisms 110 at different positions of the light guide plate 10 may also be different from each other, and the specific values of the first angles β1 and the second angles β2 of the first prisms 110 at different positions of the light guide plate 10 may also be different from each other.

For example, as illustrated in FIG. 1 and FIG. 2, the plurality of first prisms 110 are arranged at intervals from the light incident surface 101 in the first direction R1, and values of the intervals between adjacent first prisms 110 gradually reduce as distances of the intervals away from the light incident surface 101 increase. That is, the plurality of first prisms 110 are arranged at intervals from sparsely to densely from the light incident surface 101 in the first direction R1. Therefore, it may be avoided that the light emitted toward the light-emitting surface 103 at the position away from the light incident surface 101 in the light guide plate 10 becomes less because the light is only emitted from the light incident surface 101 on one side of the light guide plate 10, so that the light at different positions in the first direction R1 in the light guide plate 10 may be uniformly reflected to the light-emitting surface 103, and the brightness of the light emitted at various positions of the light guide plate 10 in the first direction R1 may be kept uniform and consistent, thereby improving the brightness uniformity of the display image of the display device including the light guide plate 10 to achieve a better image display effect.

For example, in some embodiments of the present disclosure, the values of the intervals between the adjacent first prisms 110 may be set based on a Bessel function. For example, the distance between the first prism 110 and the light incident surface 101 in the first direction R1 may be obtained according to the following ordinary differential equation (i.e., the Bessel equation):

$$x^2 \frac{d^2 y}{dx^2} + x \frac{dy}{dx} + (x^2 - \lambda^2) y = 0$$

where λ is an order of the corresponding Bessel function.

For example, in the above ordinary differential equation, the value of x obtained when y=0 is the value of the distance between the first prism 110 and the light incident surface 101.

Thus, the light reflected to the light-emitting surface 103 at various positions in the first direction R1 in the light guide plate 10 may be kept uniform and consistent, thereby improving the brightness uniformity of the light emitted at various positions of the light guide plate 10 in the first direction R1, improving the brightness uniformity of the display image of the display device including the light guide plate 10, and further achieving a better image display effect.

It should be noted that, in some other embodiments of the present disclosure, the values of the intervals between the adjacent first prisms 110 in the first direction R1 may also be set based on other types of functions (such as the polynomial function, the mesh function, etc.) to satisfy different practical requirements, or other suitable methods may also be used to optimize the distribution of the values of the intervals, which is not limited in the embodiments of the present disclosure.

Thus, the first prism structure array may guide the light emitted from the light incident surface 101 and allows the incident light to be reflected by the light reflection surface 102 and uniformly emitted toward the light-emitting surface 103 according to a predetermined path, so that the light guide plate 10 may achieve functions of light guide and light homogenization, and the brightness uniformity of the display image of the display device including the light guide plate 10 may be improved. For example, the first prism structure array may allow the guided light to be emitted toward the light-emitting surface 103 in the direction approaching the third direction R3, so that the light-emitting angle of the light emitted toward the light-emitting surface 103 may be further shrunk in the first direction R1, and the light-emitting angle of the light emitted from the light-emitting surface 103 is reduced, thereby improving the central brightness of the light emitted by the light guide plate 10 to enable the light guide plate 10 to achieve the brightness enhancement function and improving the contrast of the display image of the display device including the light guide plate 10.

For example, in some other embodiments of the present disclosure, in the case where the first prism is in a quadrangular prism shape, a pentagonal prism shape, or other prism shapes, the first prism includes at least one inclined surface enable to be irradiated by the light emitted from the light incident surface and facing the light incident surface, such as the second prism surface 112 as illustrated in FIG. 2, so that the light emitted from the light incident surface may be reflected by the inclined surface and then emitted toward the light-emitting surface, so as to implement guiding the light emitted from the light incident surface. Accordingly, in the case where the first prism is in a quadrangular prism shape, a pentagonal prism shape, or other prism shapes, the arrangement position of the inclined surface, and the size of the angle between the inclined surface and the first plane may be set according to the specific structure of the first prism, and for example, the angle relationship between the inclined surface and the first plane, and the angle relationship between the first plane and other prism surfaces may be adjusted, so that the light reflected by the inclined surface may be emitted to the light-emitting surface 103 in the direction approaching the third direction R3, thereby further shrinking the light-emitting angle of the light emitted toward the light-emitting surface 103 in the first direction R1. The embodiments of the present disclosure are not limited in this aspect.

For example, in some embodiments of the present disclosure, the second cylindrical structure is configured to enable the light emitted toward the light-emitting surface to be uniformly emitted from the light-emitting surface, and is configured to enable a direction of the light emitted from the light-emitting surface to approach the third direction in the second plane perpendicular to the first direction, the third direction being perpendicular to the first plane.

Figure 4:
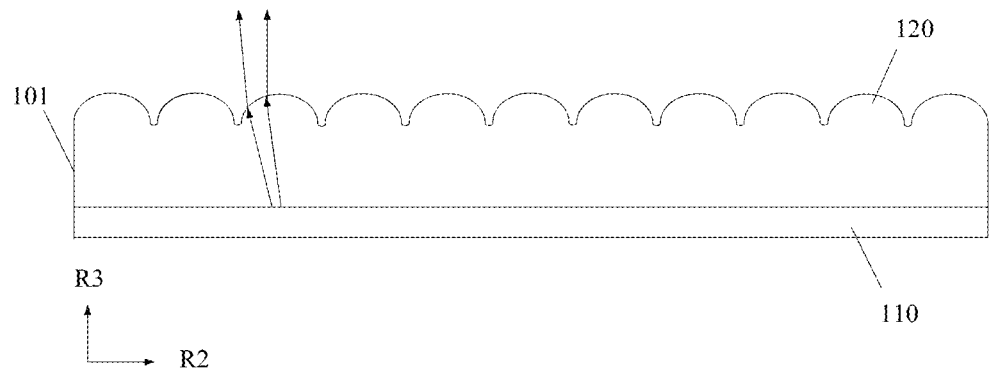
FIG. 4 is a schematic diagram of a cross section of the light guide plate illustrate in FIG. 1 perpendicular to a first direction R1.

FIG. 4 is a schematic diagram of a cross section of the light guide plate illustrate in FIG. 1 perpendicular to the first direction R1.

For example, as illustrated in FIG. 4, the second cylindrical structures 120 are arranged side by side in the second direction R2, an outline shape of a cross section of the second cylindrical structure 120 perpendicular to the first direction R1 is a free curve which curves outwards, and a convex direction of the free curve is a direction away from the light reflection surface 102, for example, the convex direction of the free curve being approximate to the direction of the light emitted by the light guide plate 10. For example, the free curve can be stretched in the first direction R1 to form the second cylindrical structure 120 having the curved surface.

For example, as illustrated in FIG. 1 and FIG. 4, the light emitted toward the light-emitting surface 103 is refracted on the outline surface of the second cylindrical structure 120, and the refracted light has a smaller angle with the third direction R3, so that the direction of the light emitted from the light-emitting surface 103 may approach the third direction R3, and the light-emitting angle of the light emitted by the light guide plate 10 may be shrunk in the second plane including the second direction R2 and the third direction R3, thereby improving the central brightness of the light emitted by the light guide plate 10. Thus, the plurality of second cylindrical structures 120 further shrink the light-emitting angle of the light emitted from the light-emitting surface 103 in the second direction R2 through the cross-sectional outline of the convex free curve, and cooperate with the plurality of first prisms 110 arranged in sequence in the first direction R1, so that the light-emitting angle of the light emitted by the light guide plate 10 may be shrunk in both the first direction R1 and the second direction R2, thereby further improving the central brightness of the light emitted by the light guide plate 10 to enable the light guide plate 10 to achieve the brightness enhancement function, improving the contrast of the display image of the display device including the light guide plate 10, and providing the user with a higher-quality image display effect.

In addition, the curved surface design of the second cylindrical structure 120 may also allow the light to be uniformly emitted from the light-emitting surface 103 in the second plane including the second direction R2 and the third direction R3, so as to cooperate with the first prism structure array to further improve the brightness uniformity of the light emitted by the light guide plate 10 and improve the brightness and uniformity of the light provided by the backlight module including the light guide plate 10, thereby improving the brightness uniformity of the display image of the display device including the light guide plate 10 and providing the user with a higher-quality image display effect.

The second cylindrical structure is specifically described below by taking the cross-sectional outline shape of the second cylindrical structure illustrated in FIG. 5A and FIG. 5B as an example.

Figure 5A:
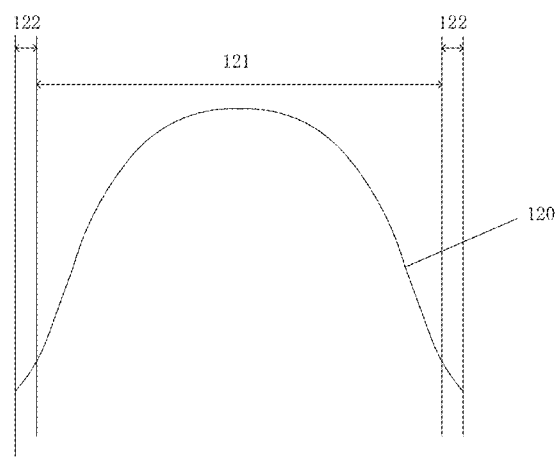
FIG. 5A is a schematic diagram of a cross-sectional outline shape of one specific example of a second cylindrical structure illustrated in FIG. 4.

FIG. 5A is a schematic diagram of a cross-sectional outline shape of one specific example of the second cylindrical structure illustrated in FIG. 4.

For example, as illustrated in FIG. 4 and FIG. 5A, the outline shape of the cross section of the second cylindrical structure 120 perpendicular to the first direction R1 is a convex free curve, the free curve may include a first curve portion 121 and second curve portions 122, the first curve portion 121 is located at a middle position of the free curve, and the second curve portions 122 are respectively located on both sides of the first curve portion 121. For example, the first curve portion 121 is a convex curve portion, a convex direction of the first curve portion 121 is the direction away from the light reflection surface 102, and the second curve portions 122 are concave curve portions. Thus, the free curve including the first curve portion 121 and the second curve portions 122 is stretched in the first direction R1 to form the second cylindrical structure 120 having a curved surface.

For example, second curve portions 122 of adjacent second cylindrical structures 120 are directly connected with each other. Because the second curve portion 122 is the concave curve portion, for example, a curvature of the second curve portion 122 may be set to be opposite to a curvature of the first curve portion 121, and therefore, the second curve portions 122 which are connected with each other may allow edges of two second cylindrical structures 120 to be in smooth transition with each other, so as to reduce an abrupt change of the curvature at the edge connection of the two second cylindrical structures 120, thereby improving the effect of shrinking the light-emitting angle of the light at the edge of the second cylindrical structure 120, so that the second cylindrical structure 120 may shrink the light-emitting angle of the light, for example, having a larger light-emitting angle, emitted toward the light-emitting surface 103. For example, the second cylindrical structure 120 may effectively shrink the light-emitting angle of large-angle light with the light-emitting angle between 140° and 160°, and further may effectively shrink the light-emitting angle of large-angle light with the light-emitting angle between 150° and 160°, thereby further improving the central brightness of the light emitted by the light guide plate 10.

In addition, because the adjacent second cylindrical structures 120 are connected with each other through the smooth second curve portion 122, the processing difficulty and processing error between the two adjacent second cylindrical structures 120 may be significantly reduced in the process of preparing the second cylindrical structure array, thereby improving the accuracy of the prepared light guide plate 10 and reducing the processing difficulty of the light guide plate 10, which may facilitate mass production and application of the light guide plate 10.

Furthermore, the cooperative design of the first curve portion 121 and the second curve portions 122 may also reduce the size of the second cylindrical structure 120 in the third direction R3, that is, reduce the height of the second cylindrical structure 120, so that the thickness of the light guide plate 10 may be reduced, and for example, the backlight module or the display device including the light guide plate 10 may achieve the ultra-thin design solution.

Figure 5B:
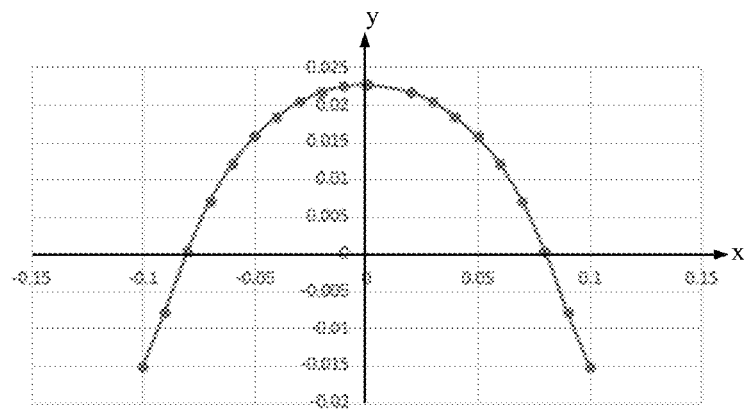
FIG. 5B is a function curve diagram corresponding to the cross-sectional outline shape of the second cylindrical structure illustrated in FIG. 5A.
Figure 5C:
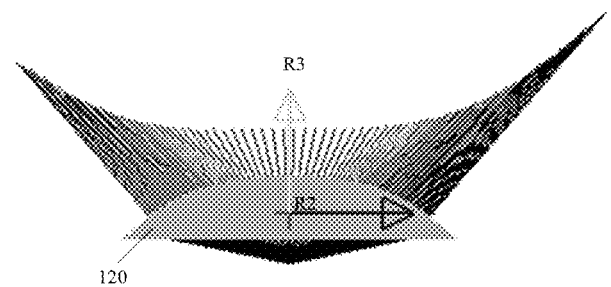
FIG. 5C is a schematic diagram of an effect of the second cylindrical structure, fitted by using the function curve illustrated in FIG. 5B, on light.

FIG. 5B is a function curve diagram corresponding to the cross-sectional outline shape of the second cylindrical structure illustrated in FIG. 5A, and FIG. 5C is a schematic diagram of an effect of the second cylindrical structure, fitted by using the function curve illustrated in FIG. 5B, on light.

For example, as illustrated in FIG. 5B, a function expression of the free curve of the cross-sectional outline shape of the second cylindrical structure 120 may be:

$$y(x) = \frac{cx^2}{1 + \sqrt{1 - (1+k)c^2 x^2}} + \alpha_1 x + \alpha_2 x^2$$

where c is a curvature, k is a conic coefficient, $\alpha_1$ is a primary term coefficient, and $\alpha_2$ is a quadratic term coefficient.

For example, as illustrated in FIG. 5C, the second cylindrical structure 120 fitted according to the above function expression may shrink the light-emitting angle of the light emitted toward the light-emitting surface 103 in the second direction R2, and may further allow the light to be emitted uniformly along the light-emitting surface 103 in the second plane including the second direction R2 and the third direction R3. Therefore, in the case of cooperating with the first prism structure array, the second cylindrical structure array may improve the central brightness of the light emitted by the light guide plate 10 and improve the brightness uniformity of the light emitted by the light guide plate 10, thereby further improving the contrast and the brightness uniformity of the display image of the display device including the light guide plate 10 and providing the user with a higher-quality image display effect.

The light-emitting angle of the light emitted by the light guide plate including the first prism structure array and the second cylindrical structure array provided by the embodiments of the present disclosure is further described below by being compared with a light-emitting angle of light emitted by a dot light guide plate as an example.

Figure 6:
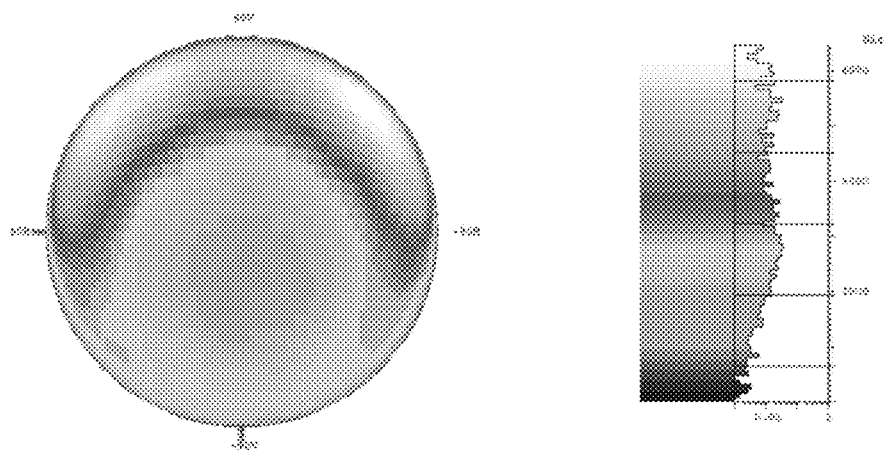
FIG. 6 is a schematic diagram of a light-emitting angle and brightness distribution of light emitted by a dot light guide plate.
Figure 7A:
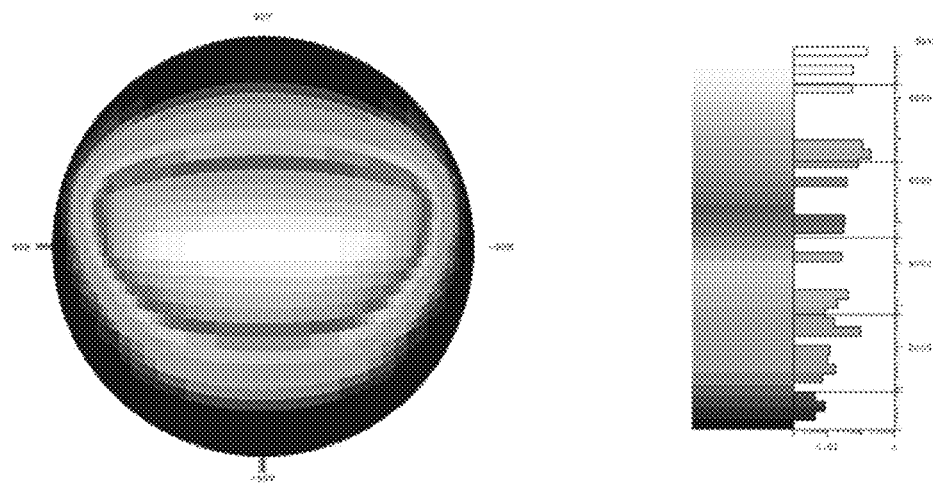
FIG. 7A is a schematic diagram of a light-emitting angle and brightness distribution of light guided by a first prism structure array of the light guide plate illustrated in FIG. 1.
Figure 7B:
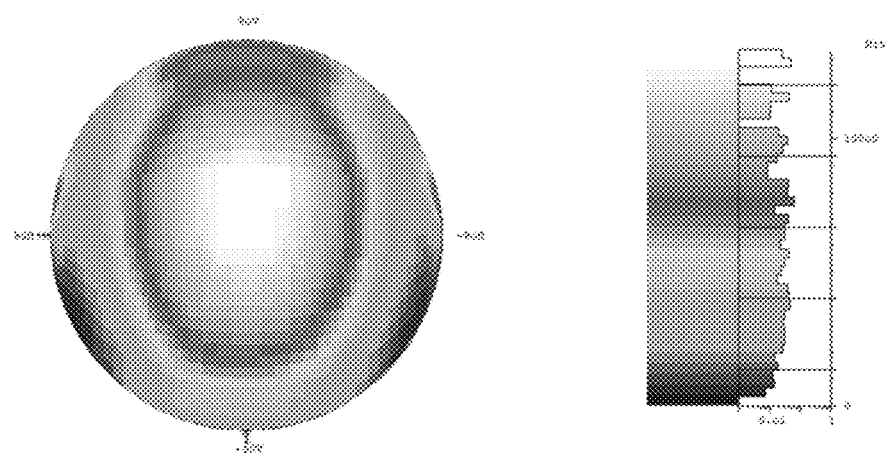
FIG. 7B is a schematic diagram of a light-emitting angle and brightness distribution of light emitted from a light-emitting surface of the light guide plate illustrated in FIG. 1.

FIG. 6 is a schematic diagram of a light-emitting angle and brightness distribution of light emitted by a dot light guide plate, FIG. 7A is a schematic diagram of a light-emitting angle and brightness distribution of light guided by the first prism structure array of the light guide plate illustrated in FIG. 1, and FIG. 7B is a schematic diagram of a light-emitting angle and brightness distribution of light emitted from the light-emitting surface of the light guide plate illustrated in FIG. 1.

For example, as illustrated in FIG. 6, the light-emitting angle of the light emitted by the dot light guide plate used for comparison is larger and deviates from the center viewing angle, and therefore, it is usually necessary to provide an additional optical film material to adjust the light-emitting angle of the emitted light to be near the perspective viewing angle, so that the light-emitting efficiency is greatly reduced, and difficulty of the preparation process is increased. Moreover, as illustrated in FIG. 6, the central brightness of the light emitted by the dot light guide plate is low, and for example, the brightness of the brightest point is only about 6000 nits, so that the contrast of the display image of the display device using the dot light guide plate is seriously affected, and the image display effect provided for the user is poor.

For example, as illustrated in FIG. 7A, when the light guide plate 10 illustrated in FIG. 1 is used to guide light, the first prism structure array may guide and homogenize the light emitted from the light incident surface 101 and shrink the light-emitting angle of the light emitted toward the light-emitting surface 103 in the first direction R1, so that the direction of the light emitted toward the light-emitting surface 103 approaches the perspective viewing angle direction, that is, the light-emitting angle of the light emitted by the light guide plate 10 is already near the perspective viewing angle. Therefore, there is no need to additionally provide other optical film materials or functional layers to adjust the light-emitting angle of the emitted light, thereby simplifying the structure of the light guide plate 10 and reducing the preparation cost of the light guide plate 10, which may facilitate the design of the ultra-thin backlight module or display device including the light guide plate 10 and also may facilitate mass production and application thereof. In addition, compared to the dot light guide plate illustrated in FIG. 6, the first prism structure array of the light guide plate 10 provided by the embodiments of the present disclosure may improve the central brightness of the light emitted toward the light-emitting surface 103, and for example, the brightness of the brightest point may reach more than 8000 nits, thereby improving the contrast of the display image of the display device using the light guide plate 10 and providing the user with a higher-quality image display effect.

For example, as illustrated in FIG. 7B, when the light is emitted from the light-emitting surface 103, the second cylindrical structure array may further shrink the light-emitting angle of the light in the second direction R2, thereby allowing the light-emitting angle of the light emitted by the light guide plate 10 to be effectively shrunk in both the first direction R1 and the second direction R2, which further improves the central brightness of the light emitted by the light guide plate 10, for example, the brightness of the brightest point reaching more than 10,000 nits. Therefore, the cooperative design of the first prism structure array and the second cylindrical structure array enables the light guide plate 10 to achieve the brightness enhancement function, thereby significantly improving the contrast of the display image of the display device using the light guide plate 10 and providing the user with a higher-quality image display effect.

For example, with the cooperation effect of the first prism structure array and the second cylindrical structure array, the light guide plate provided by some embodiments of the present disclosure may also implement regional light control of the display region.

The following takes an example of providing a plurality of point light sources (e.g., light-emitting diodes), which can be controlled independently, on one side of the light incident surface of the light guide plate (for example, with reference to FIG. 12) to describe that a portion, corresponding to the display region of one row of the display panel (e.g., a liquid crystal display panel), in the light guide plate may be lighted up to implement light control of a partial display region. The plurality of point light sources are arranged side by side and uniformly on one side of the light incident surface of the light guide plate, and for example, when a point light source is lighted up, a portion, located in the light-emitting direction of the point light source, in the light guide plate is lighted up.

Figure 8:
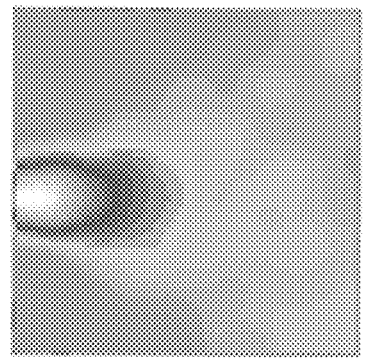
FIG. 8 is a schematic effect diagram of a portion, corresponding to a partial display region of a display panel, of an ordinary light guide plate being lighted up.

FIG. 8 is a schematic effect diagram of a portion, corresponding to a partial display region of a display panel, of an ordinary light guide plate being lighted up. For example, as illustrated in FIG. 8, when a point light source on one side of the light guide plate is turned on, a portion, corresponding to the display region corresponding to at least one row of the display panel, of the light guide plate is lighted up, and accordingly, the display region corresponding to the at least one row may perform, for example, a display operation by using the light emitted through the light guide plate. However, the light emitted by the light guide plate may irradiate the display region corresponding to other rows adjacent to the at least one row, and therefore, it is difficult to independently control the brightness and darkness level of the lighted-up display region, so that the display panel using the light guide plate cannot achieve the ideal technical effect of regional light control. In addition, because of the low central brightness and poor brightness uniformity of the light provided by the light guide plate, the contrast and the brightness uniformity of the display image of the display panel using the light guide plate are also reduced, thereby seriously affecting the image display effect.

Figure 9A:
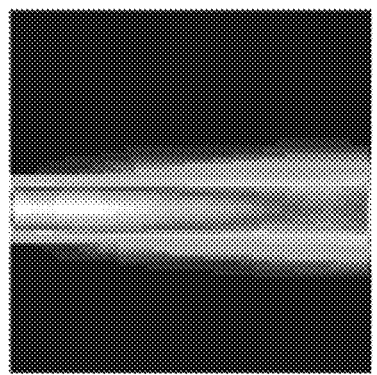
FIG. 9A to FIG. 9C are schematic effect diagrams of portions, corresponding to different partial display regions of a display panel, of the light guide plate illustrated in FIG. 1 being lighted up.
Figure 9B:
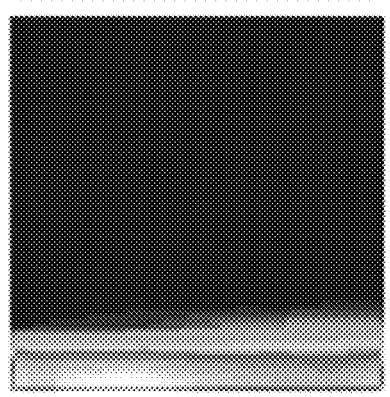
Figure 9C:
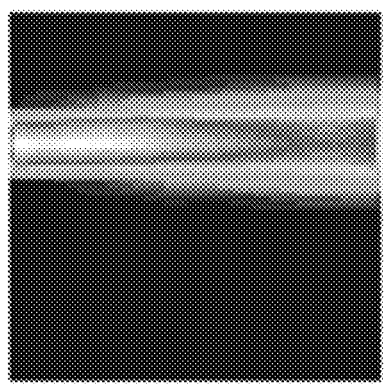

FIG. 9A to FIG. 9C are schematic effect diagrams of portions, corresponding to different partial display regions of a display panel, of the light guide plate illustrated in FIG. 1 being lighted up.

For example, when the light guide plate 10 illustrated in FIG. 1 is used to provide such as display light to the display panel, the point light sources at different positions on one side of the light incident surface 101 of the light guide plate 10 may be turned on or turned off to control the brightness and darkness level of different partial display regions of the display panel, thereby achieving the regional light control effect of the display region.

For example, as illustrated in FIG. 9A, the point light source located at the center position on one side of the light incident surface 101 is turned on to light up the portion, corresponding to the one-row display region located in a middle portion of the display panel, in the light guide plate 10. Compared with the ordinary light guide plate illustrated in FIG. 8, the light guide plate 10 provided by the embodiments of the present disclosure may improve the central brightness of the emitted light, thereby avoiding adverse effects of the provided light on other display regions other than the target display region, which allows the lighted-up display region to have obvious brightness and darkness contrast compared with other non-lighted up display regions, thereby implementing control of the brightness and darkness level of different partial display regions of the display panel and further achieving the technical effect of regional light control of the display panel.

For example, as illustrated in FIG. 9B and FIG. 9C, it is also possible to turn on the point light sources located at other positions on one side of the light incident surface 101 of the light guide plate 10 to light up different portions, corresponding to display regions of different rows of the display panel, in the light guide plate 10. For example, as illustrated in FIG. 9B, the point light source located at an edge position on one side of the light incident surface 101 is turned on to light up a portion, corresponding to the one-row display region at the bottom of the display panel, in the light guide plate 10, so that the brightness and darkness level of the display region at the edge position of the display panel can be controlled to achieve the light control effect of the edge region of the display panel. Alternatively, as illustrated in FIG. 9C, any point light source located between the edge position and the center position on one side of the light incident surface 101 may be turned on to control the brightness and darkness level of any display region of the display panel, so that the display panel may achieve the regional light control effect.

For example, in some embodiments of the present disclosure, the light guide plate 10 may be integrally formed (for example, injection molded), for example, formed in an integrated structure, that is, the first prism structure array is directly formed on the light reflection surface 102 of the light guide plate 10, and the second cylindrical structure array is directly formed on the light-emitting surface 103 of the light guide plate 10, so that the light guide plate 10 may be formed by using only one refractive index material, which reduces the number of optical film materials required for the light guide plate 10, thereby simplifying the structure of the light guide plate 10 and reducing the preparation cost of the light guide plate 10, which may facilitate design of the ultra-thin backlight module or display device including the light guide plate 10 and may further facilitate mass production and application thereof.

For example, the integrally formed light guide plate 10 does not need to be glued, and may be formed by, for example, an injection molding process or a higher-precision process such as an etching process, and the embodiments of the present disclosure are not limited in this aspect. Therefore, the preparation cost and the processing difficulty of the light guide plate 10 may be greatly reduced, thereby facilitating mass production and application of the light guide plate 10.

For example, in some embodiments of the present disclosure, a material of the light guide plate 10 may include a plastic material or other materials easy to process and form. For example, the material of the light guide plate 10 may include the polymethyl methacrylate (PMMA), polycarbonate (PC), polyimide (PI), polyethersulfone resin (PES), or at least one of polyethylene terephthalate (PET) materials, and the embodiments of the present disclosure are not limited in this aspect.

Figure 10:
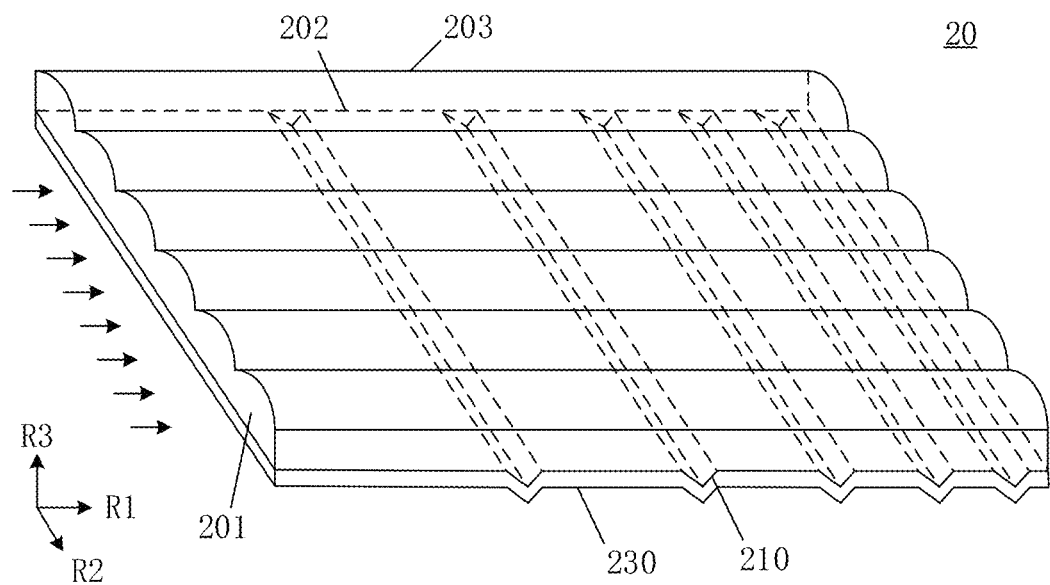
FIG. 10 is a schematic diagram of a stereoscopic structure of another light guide plate provided by some embodiments of the present disclosure.

FIG. 10 is a schematic diagram of a stereoscopic structure of another light guide plate provided by some embodiments of the present disclosure. For example, as illustrated in FIG. 10, a light guide plate 20 may further include a reflective layer 230. The reflective layer 230 is in direct contact with a light reflection surface 202 and is located on a side of the light reflection surface 202 away from a light-emitting surface 203, that is, located on a side of the light reflection surface 202 facing away from a light-emitting direction of the light guide plate 20, so that light refracted from the light reflection surface 202 may be recycled to improve the light efficiency utilization rate of the light guide plate 20.

For example, the reflective layer 230 may use a material with high reflectivity. The material of the reflective layer 230 may be silver, aluminum, or any other material, and may be formed on the light reflection surface 202 by, for example, a plating method, thereby on the basis of improving the light efficiency utilization rate of the light guide plate 20, allowing the light guide plate 20 to be integrally formed, simplifying the structural design of the light guide plate 20, and reducing the preparation cost of the light guide plate 20.

For example, as illustrated in FIG. 10, the reflective layer 230 may include the same structural outline as the first prism structure array, and for example, may include the same outline shape as a first prism 210, so as to achieve direct contact with the light reflection surface 202.

It should be noted that other structures and functions of the light guide plate 20 except for the reflective layer 230 are substantially the same as those of the light guide plate 10 illustrated in FIG. 1, and details are not described herein again.

Figure 11:
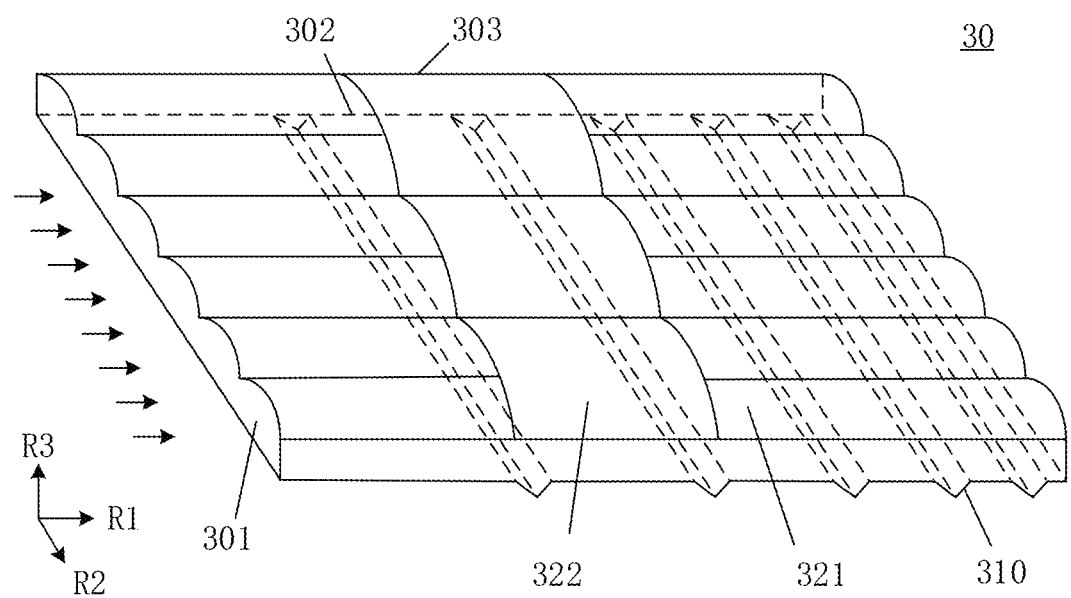
FIG. 11 is a schematic diagram of a stereoscopic structure of still another light guide plate provided by some embodiments of the present disclosure.

FIG. 11 is a schematic diagram of a stereoscopic structure of still another light guide plate provided by some embodiments of the present disclosure. For example, as illustrated in FIG. 11, a light guide plate 30 may be provided with a plurality of groups of second cylindrical structure arrays according to display requirements of the display device including the light guide plate 30. For example, each group of second cylindrical structure array may include at least one second cylindrical structure 321 and at least one second cylindrical structure 322 arranged side by side in the second direction R2, and a width of the second cylindrical structure 321 is different from a width of the second cylindrical structure 322.

For example, in some other embodiments of the present disclosure, the second cylindrical structure 321 and the second cylindrical structure 322 may also be arranged in a staggered manner. Alternatively, in some other embodiments of the present disclosure, the second cylindrical structure 321 and the second cylindrical structure 322 may also be different in height in the third direction R3, and the embodiments of the present disclosure are not limited in this aspect.

It should be noted that other structures and functions of the light guide plate 30 are substantially the same as those of the light guide plate 10 illustrated in FIG. 1, and details are not described herein again.

At least an embodiment of the present disclosure further provides a backlight module, and the backlight module includes a light guide plate, and a light source on a side of the light incident surface of the light guide plate. The light guide plate includes: a light incident surface, a light reflection surface, and a light-emitting surface, the light reflection surface is opposite to the light-emitting surface, and the light incident surface is connected to the light reflection surface and the light-emitting surface, respectively. The light reflection surface includes a first prism structure array, the first prism structure array includes a plurality of first prisms arranged in sequence in a first direction, and the first direction is perpendicular to the light incident surface. The first prism structure array is configured to enable light emitted from the light incident surface to be emitted toward the light-emitting surface. The light-emitting surface includes a second cylindrical structure array, the second cylindrical structure array includes a plurality of second cylindrical structures arranged side by side in a second direction, the second direction is perpendicular to the first direction, and a first plane including the first direction and the second direction is perpendicular to the light incident surface.

At least an embodiment of the present disclosure further provides a backlight module, and the backlight module includes the light guide plate according to any one of the embodiments of the present disclosure and a light source located on a side of the light incident surface of the light guide plate.

Figure 12:
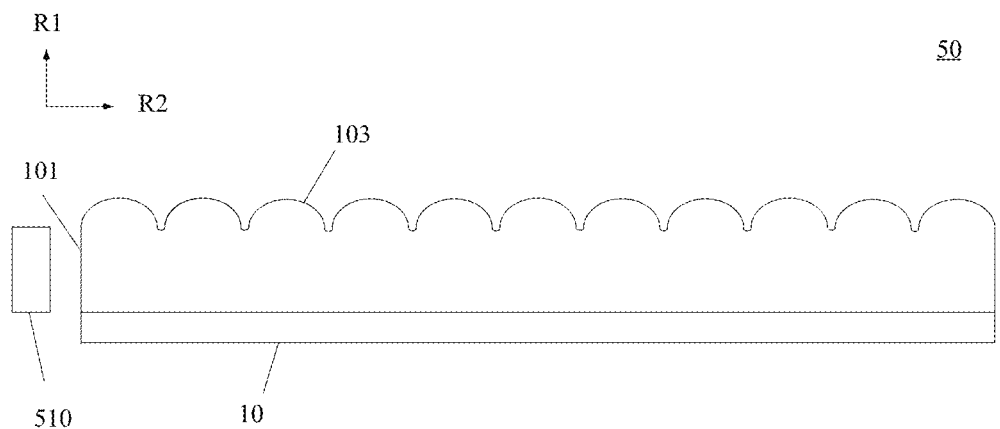
FIG. 12 is a schematic structural diagram of a backlight module provided by some embodiments of the present disclosure.

FIG. 12 is a schematic structural diagram of a backlight module provided by some embodiments of the present disclosure. For example, as illustrated in FIG. 12, the backlight module 50 is a side-lit backlight module, and includes the light guide plate 10 illustrated in FIG. 1 and a light source 510 located on a side of the light incident surface 101 of the light guide plate 10. For example, light emitted by the light source 510 is emitted into the light guide plate 10 from the light incident surface 101 and is emitted from the light-emitting surface 103 after being guided by the light guide plate 10.

For example, the light source 510 may include a point light source or a line light source, the point light source may be, for example, a light-emitting diode (LED), the line light source may be, for example, a cold cathode fluorescent lamp (CCFL), and the embodiments of the present disclosure are not limited in this aspect.

For example, the design of the side-lit backlight module may reduce the overall thickness of the backlight module 50 and the display device including the backlight module 50, so that the backlight module 50 may achieve the ultra-thin design effect while integrating a plurality of optical functions such as light guide, light homogenization, brightness enhancement, etc. For example, the backlight module 50 may be used as a backlight for a small-sized or medium-sized display device such as a mobile phone, a tablet computer, or the like, and may also be used as a backlight for a large-sized display device such as a liquid crystal television, and the embodiments of the present disclosure are not limited in this aspect.

For example, the backlight module 50 may further include a brightness enhancement film. For example, the brightness enhancement film may be provided on a side of the light-emitting surface 103 of the light guide plate 10, so as to cooperate with the light guide plate 10 to further reduce the light-emitting angle of the light provided by the backlight module 50, thereby improving the central brightness of the emitted light to achieve the brightness enhancement effect.

Other technical effects and implementation principles of the backlight module 50 are basically the same as those of the light guide plate (for example, the light guide plate 10, the light guide plate 20, or the light guide plate 30) provided by the embodiments of the present disclosure, and details are not described herein again.

At least an embodiment of the present disclosure further provides a display device, and the display device includes a display panel and the backlight module according to any one of the embodiments of the present disclosure located on a light incident side of the display panel.

Figure 13:
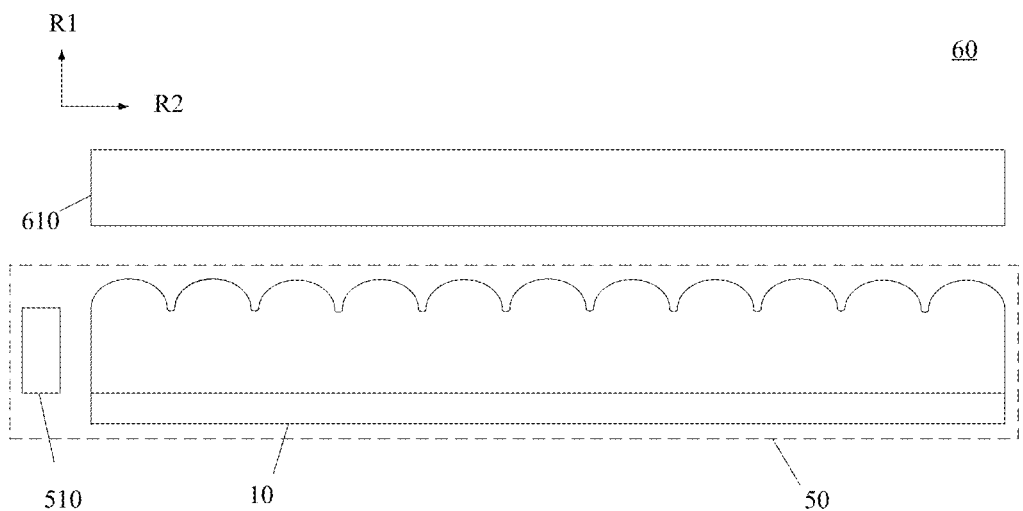
FIG. 13 is a schematic structural diagram of a display device provided by some embodiments of the present disclosure.

FIG. 13 is a schematic structural diagram of a display device provided by some embodiments of the present disclosure. For example, as illustrated in FIG. 13, a display device 60 may include a display panel 610 and the backlight module 50 illustrated in FIG. 12, and the backlight module 50 is located on a light incident side of the display panel 610 to provide such as display light for the display panel 610.

For example, the display panel 610 may be a liquid crystal display panel, an electronic paper display panel, or any other type of panel with a display function, and the embodiments of the present disclosure are not limited in this aspect.

Technical effects and implementation principles of the display device 60 are basically the same as those of the backlight module (e.g., the backlight module 50) provided by the embodiments of the present disclosure, or the light guide plate (e.g., the light guide plate 10, the light guide plate 20, or the light guide plate 30) provided by the embodiments of the present disclosure, and details are not described herein again.

For example, the display device 60 may be any product or component with a display function, such as a liquid crystal panel, an electronic paper, a mobile phone, a tablet computer, a television, a display, a laptop, a digital photo frame, a navigator, etc., which is not limited by the embodiments of the present disclosure.

At least an embodiment of the present disclosure further provides a manufacturing method of the light guide plate according to any one of the embodiments of the present disclosure.

Figure 14:
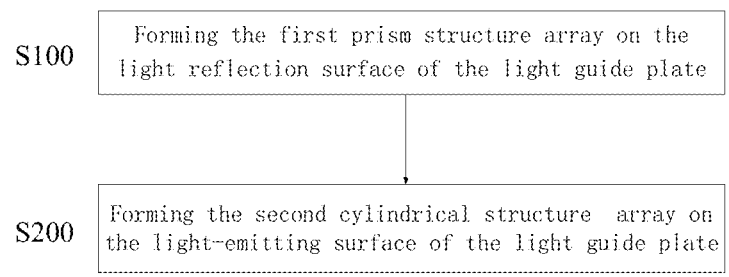
FIG. 14 is a flowchart of a manufacturing method of a light guide plate provided by some embodiments of the present disclosure.

FIG. 14 is a flowchart of a manufacturing method of a light guide plate provided by some embodiments of the present disclosure. For example, as illustrated in FIG. 14, the manufacturing method of the light guide plate includes the following steps.

Step S100: forming the first prism structure array on the light reflection surface of the light guide plate.

Step S200: forming the second cylindrical structure array on the light-emitting surface of the light guide plate.

The manufacturing method of the light guide plate provided by some embodiments of the present disclosure is described below in combination with the light guide plate 10 illustrated in FIG. 1.

For example, the manufacturing method of the light guide plate 10 illustrated in FIG. 1 includes the following steps.

Step S110: forming the first prism structure array on the light reflection surface 102 of the light guide plate 10.

Step S120: forming the second cylindrical structure array on the light-emitting surface 103 of the light guide plate 10.

For example, the first prism structure array and the second cylindrical structure array may be respectively formed on the light reflection surface 102 and the light-emitting surface 103 of the light guide plate 10 by processes such as injection molding or etching.

For example, when the first prism structure array and the second cylindrical structure array are formed by an etching process, a light guide plate structure, for example, in a cube shape or any other suitable shape may be formed first by injection molding, and then the first prism structure array and the second cylindrical structure array are respectively formed on the light reflection surface 102 and the light-emitting surface 103 by engraving with a carving knife or striking with a striker.

For example, when the first prism structure array and the second cylindrical structure array are formed by an injection molding process, a mold with the first prism 110 or the second cylindrical structure 120 may be first engraved with a carving knife, scraped with a scraper, or struck with a striker, and then, the mold is respectively used to form the first prism structure array and the second cylindrical structure array by the injection molding process, so as to form the light guide plate 10.

The manufacturing method of the light guide plate provided by the embodiments of the present disclosure may allow the light guide plate 10 to be integrally formed, and the manufacturing method is relatively simple in operation, easy to process, and low in preparation cost, so that the manufacturing method is beneficial to implementing the mass production and application of the light guide plate 10.

It should be noted that, in the manufacturing method of the light guide plate provided by some other embodiments of the present disclosure, the first prism structure array and the second cylindrical structure array may also be formed by using other suitable methods, and the embodiments of the present disclosure are not limited in this aspect.

The following statements should be noted:

(1) The accompanying drawings involve only the structure(s) in connection with the embodiment(s) of the present disclosure, and other structure(s) can be referred to common design(s).

(2) For clarity, in accompanying drawings for illustrating the embodiment(s) of the present disclosure, the thickness of a layer or a structure may be enlarged or reduced, that is, these accompanying drawings are not drawn according to actual scales. It should be understood that, in a case where a component or element such as a layer, film, area, substrate or the like is referred to be "on" or "under" another component or element, it may be directly on or under the another component or element or a component or element is interposed therebetween.

(3) In case of no conflict, features in one embodiment or in different embodiments can be combined to obtain new embodiments.

What have been described above are only specific implementations of the present disclosure, the protection scope of the present disclosure is not limited thereto. Any modifications or substitutions within the technical scope of the present disclosure easily obtained by those skilled in the art should be within the protection scope of the present disclosure. Therefore, the protection scope of the present disclosure should be based on the protection scope of the claims.

What is claimed is:

1. A light guide plate, comprising: a light incident surface, a light reflection surface, and a light-emitting surface,
   wherein the light reflection surface is opposite to the light-emitting surface, and the light incident surface is connected to the light reflection surface and the light-emitting surface, respectively;
   the light reflection surface comprises a first prism structure array, the first prism structure array comprises a plurality of first prisms arranged in sequence in a first direction, and the first direction is perpendicular to the light incident surface;
   the first prism structure array is configured to enable light emitted from the light incident surface to be emitted toward the light-emitting surface;
   the light-emitting surface comprises a second cylindrical structure array, the second cylindrical structure array comprises a plurality of second cylindrical structures arranged side by side in a second direction,
   the second direction is perpendicular to the first direction, and a first plane comprising the first direction and the second direction is perpendicular to the light incident surface;
   the second cylindrical structure is configured to enable light emitted toward the light-emitting surface to be uniformly emitted from the light-emitting surface, and is configured to enable a direction of light emitted from the light-emitting surface to approach a third direction in a second plane perpendicular to the first direction, the third direction being perpendicular to the first plane;
   an outline shape of a cross section of the second cylindrical structure perpendicular to the first direction is a free curve which curves outwards, and a convex direction of the free curve is a direction away from the light reflection surface;
   the free curve comprises a first curve portion and a plurality of second curve portions;
   the first curve portion is at a middle position of the free curve, and the plurality of second curve portions are on both sides of the first curve portion, respectively; and
   the first curve portion is a convex curve portion, a convex direction of the first curve portion is the direction away from the light reflection surface, and the second curve portions are concave curve portions.

2. The light guide plate according to claim 1, wherein the plurality of second cylindrical structures are continuously arranged in the second direction, and second curve portions of adjacent second cylindrical structures are directly connected with each other.

3. The light guide plate according to claim 1, wherein the first prism structure array is configured to enable the light emitted from the light incident surface to be emitted toward the light-emitting surface in a direction approaching the third direction in a third plane,
   and the third plane is perpendicular to the second direction.

4. The light guide plate according to claim 1, wherein each of the first prisms is in a prism shape and comprises an inclined surface enable to be irradiated by the light emitted from the light incident surface, and the inclined surface faces the light incident surface.

5. The light guide plate according to claim 4, wherein each of the first prisms is in a triangular prism shape and comprises a first prism surface and a second prism surface,
   the first prism surface intersects with the second prism surface,
   a first angle between the first prism surface and the first plane is from 80° to 90°, a second angle between the second prism surface and the first plane is from 35° to 40°,
   the second prism surface is the inclined surface facing the light incident surface, and
   a distance between the light incident surface and an intersection line of the first prism surface and the first plane is less than a distance between the light incident surface and an intersection line of the second prism surface and the first plane.

6. The light guide plate according to claim 1, wherein the plurality of first prisms are arranged at intervals from the light incident surface in the first direction, and
   values of the intervals between adjacent first prisms gradually reduce as distances of the intervals away from the light incident surface increase.

7. The light guide plate according to claim 6, wherein the values of the intervals between the adjacent first prisms are set based on a Bessel function.

8. The light guide plate according to claim 1, wherein the light guide plate is formed in an integrated structure.

9. The light guide plate according to claim 1, further comprising a reflective layer,
   wherein the reflective layer is on a side of the light reflection surface away from the light-emitting surface.

10. A manufacturing method of the light guide plate according to claim 1, comprising:
    forming the first prism structure array on the light reflection surface of the light guide plate, and
    forming the second cylindrical structure array on the light-emitting surface of the light guide plate.

11. The light guide plate according to claim 1, wherein a function expression of the free curve is:

$$y(x) = \frac{cx^2}{1 + \sqrt{1 - (1+k)c^2x^2}} + \alpha_1 x + \alpha_2 x^2$$

wherein c is a curvature, k is a conic coefficient, $\alpha_1$ is a primary term coefficient, and $\alpha_2$ is a quadratic term coefficient.

12. A light guide plate, comprising: a light incident surface, a light reflection surface, and a light-emitting surface,
wherein the light reflection surface is opposite to the light-emitting surface, and the light incident surface is connected to the light reflection surface and the light-emitting surface, respectively;
the light reflection surface comprises a first prism structure array, the first prism structure array comprises a plurality of first prisms arranged in sequence in a first direction, and the first direction is perpendicular to the light incident surface;
the first prism structure array is configured to enable light emitted from the light incident surface to be emitted toward the light-emitting surface;
the light-emitting surface comprises a second cylindrical structure array, the second cylindrical structure array comprises a plurality of second cylindrical structures arranged side by side in a second direction,
the second direction is perpendicular to the first direction, and a first plane comprising the first direction and the second direction is perpendicular to the light incident surface;
the second cylindrical structure is configured to enable light emitted toward the light-emitting surface to be uniformly emitted from the light-emitting surface, and is configured to enable a direction of light emitted from the light-emitting surface to approach a third direction in a second plane perpendicular to the first direction, the third direction being perpendicular to the first plane;
an outline shape of a cross section of the second cylindrical structure perpendicular to the first direction is a free curve which curves outwards, and a convex direction of the free curve is a direction away from the light reflection surface; and
a function expression of the free curve is:

$$y(x) = \frac{cx^2}{1+\sqrt{1-(1+k)c^2x^2}} + \alpha_1 x + \alpha_2 x^2$$

wherein c is a curvature, k is a conic coefficient, $\alpha_1$ is a primary term coefficient, and $\alpha_2$ is a quadratic term coefficient.

13. The light guide plate according to claim 12, the free curve comprises a first curve portion and a plurality of second curve portions;
the first curve portion is at a middle position of the free curve, and the plurality of second curve portions are on both sides of the first curve portion, respectively; and
the first curve portion is a convex curve portion, a convex direction of the first curve portion is the direction away from the light reflection surface, and the second curve portions are concave curve portions.

14. The light guide plate according to claim 12, wherein the first prism structure array is configured to enable the light emitted from the light incident surface to be emitted toward the light-emitting surface in a direction approaching the third direction in a third plane, and the third plane is perpendicular to the second direction.

15. The light guide plate according to claim 12, wherein each of the first prisms is in a prism shape and comprises an inclined surface enable to be irradiated by the light emitted from the light incident surface, and the inclined surface faces the light incident surface.

16. The light guide plate according to claim 12, wherein the plurality of first prisms are arranged at intervals from the light incident surface in the first direction, and
values of the intervals between adjacent first prisms gradually reduce as distances of the intervals away from the light incident surface increase.

17. The light guide plate according to claim 12, wherein the light guide plate is formed in an integrated structure.

18. The light guide plate according to claim 12, further comprising a reflective layer,
wherein the reflective layer is on a side of the light reflection surface away from the light-emitting surface.

19. A backlight module, comprising:
a light guide plate, comprising a light incident surface, a light reflection surface, and a light-emitting surface, wherein the light reflection surface is opposite to the light-emitting surface, and the light incident surface is connected to the light reflection surface and the light-emitting surface, respectively; and
a light source on a side of the light incident surface of the light guide plate,
wherein the light reflection surface comprises a first prism structure array, the first prism structure array comprises a plurality of first prisms arranged in sequence in a first direction, and the first direction is perpendicular to the light incident surface;
the first prism structure array is configured to enable light emitted from the light incident surface to be emitted toward the light-emitting surface;
the light-emitting surface comprises a second cylindrical structure array, the second cylindrical structure array comprises a plurality of second cylindrical structures arranged side by side in a second direction,
the second direction is perpendicular to the first direction, and a first plane comprising the first direction and the second direction is perpendicular to the light incident surface;
the second cylindrical structure is configured to enable light emitted toward the light-emitting surface to be uniformly emitted from the light-emitting surface, and is configured to enable a direction of light emitted from the light-emitting surface to approach a third direction in a second plane perpendicular to the first direction, the third direction being perpendicular to the first plane;
an outline shape of a cross section of the second cylindrical structure perpendicular to the first direction is a free curve which curves outwards, and a convex direction of the free curve is a direction away from the light reflection surface;
the free curve comprises a first curve portion and a plurality of second curve portions;
the first curve portion is at a middle position of the free curve, and the plurality of second curve portions are on both sides of the first curve portion, respectively; and
the first curve portion is a convex curve portion, a convex direction of the first curve portion is the direction away from the light reflection surface, and the second curve portions are concave curve portions.

20. A display device, comprising:
a display panel, and
the backlight module according to claim 19 on a light incident side of the display panel.

* * * * *